(12) United States Patent
McCune et al.

(10) Patent No.: US 9,038,779 B2
(45) Date of Patent: May 26, 2015

(54) GEARED ARCHITECTURE GAS TURBINE ENGINE WITH OIL SCAVENGE

(71) Applicant: United Technologies Corporation, Hartford, CT (US)

(72) Inventors: Michael E. McCune, Colchester, CT (US); Zachary R. Nado, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 14/255,169

(22) Filed: Apr. 17, 2014

(65) Prior Publication Data

US 2015/0065285 A1    Mar. 5, 2015

Related U.S. Application Data

(60) Provisional application No. 61/872,392, filed on Aug. 30, 2013.

(51) Int. Cl.
*F01D 25/18*     (2006.01)
*F16H 57/04*     (2010.01)
*G06F 17/50*     (2006.01)

(52) U.S. Cl.
CPC ........ *F16H 57/0423* (2013.01); *F16H 57/0479* (2013.01); *F16H 57/0482* (2013.01); *G06F 17/5004* (2013.01)

(58) Field of Classification Search
USPC ........................................ 184/6.11, 6.12, 6.21
See application file for complete search history.

(56) References Cited

U.S. PATENT DOCUMENTS

| | | | |
|---|---|---|---|
| 5,851,163 A | 12/1998 | Kawase et al. | |
| 8,621,839 B2 * | 1/2014 | Alecu et al. | 60/39.08 |
| 2008/0236951 A1 * | 10/2008 | Alecu et al. | 184/6.11 |
| 2009/0090096 A1 | 4/2009 | Sheridan | |
| 2011/0048856 A1 * | 3/2011 | Thivierge et al. | 184/6.11 |
| 2012/0181113 A1 * | 7/2012 | Alecu et al. | 184/6.11 |
| 2012/0233977 A1 | 9/2012 | Leese | |
| 2012/0238391 A1 | 9/2012 | McCune et al. | |
| 2013/0102432 A1 | 4/2013 | Imai et al. | |
| 2014/0064930 A1 * | 3/2014 | NguyenLoc et al. | 415/122.1 |

OTHER PUBLICATIONS

International Search Report and Written Opinion for International Application No. PCT/US2014/052251 mailed on Dec. 2, 2014.

* cited by examiner

*Primary Examiner* — William E Dondero
*Assistant Examiner* — Robert T Reese
(74) *Attorney, Agent, or Firm* — Carlson, Gaskey & Olds, P.C.

(57) ABSTRACT

A gas turbine engine includes a geared architecture with a multiple of intermediate gears, and a baffle with an oil scavenge scoop adjacent to each of the multiple of intermediate gears. A geared architecture and method are also disclosed.

30 Claims, 10 Drawing Sheets

GEARED ARCHITECTURE GAS TURBINE ENGINE WITH OIL SCAVENGE

CROSS REFERENCE TO RELATED APPLICATION

This application claims priority to U.S. Provisional Application No. 61/872,392 filed Aug. 30, 2013.

BACKGROUND

The present disclosure relates to a gas turbine engine and, more particularly, to a geared architecture therefor.

Epicyclic gear systems with planetary or star gearboxes may be used in gas turbine engines for their compact designs and efficient high gear reduction capabilities. Planetary and star gearboxes generally include three gear train elements: a central sun gear, an outer ring gear with internal gear teeth, and a plurality of planet gears supported by a planet carrier between and in meshed engagement with both the sun gear and the ring gear. The gear train elements share a common longitudinal central axis, about which at least two rotate.

In some gas turbine engine architectures where speed reduction transmission is required, the central sun gear generally receives rotary input from the engine core, the outer ring gear is stationary and the planet gear carrier rotates in the same direction as the sun gear to provide torque output at a reduced rotational speed. In contrast, in star gear trains, the planet carrier is held stationary and the output shaft is driven by the ring gear in a direction opposite that of the sun gear.

The epicyclic gear systems require lubrication during operation and typically include oil spray bar and oil baffles within the carriers. Although effective, such carrier arrangements typically require multiple components and relatively complicated assembly in which side walls of the carrier are assembled around the planet gears, separate oil spray bars and oil baffles.

SUMMARY

A gas turbine engine according to an exemplary embodiment of this disclosure, among other possible things includes a geared architecture with a multiple of intermediate gears, and a baffle with an oil scavenge scoop adjacent to each of the multiple of intermediate gears.

In a further embodiment of any of the foregoing gas turbine engines, each of the multiple of intermediate gears and the baffles are mounted to a rotational carrier.

In a further embodiment of any of the foregoing gas turbine engines, the oil scavenge scoop includes a scavenge passage with an inner scavenge passage wall, an outer scavenge passage wall and a radial outer scavenge passage wall therebetween.

In a further embodiment of any of the foregoing gas turbine engines, the radial outer scavenge passage wall defines a ramp surface.

In a further embodiment of any of the foregoing gas turbine engines, further includes an exit through a baffle end wall adjacent to the radial outer passage.

In a further embodiment of any of the foregoing gas turbine engines, the radial outer scavenge passage wall defines a peak.

In a further embodiment of any of the foregoing gas turbine engines, further includes a first exit through a first baffle end wall adjacent to the radial outer passage and a second exit through a second baffle end wall adjacent to the radial outer passage.

In a further embodiment of any of the foregoing gas turbine engines, further including a flow splitter between the inner scavenge passage wall and the outer scavenge passage wall.

In a further embodiment of any of the foregoing gas turbine engines, the inner scavenge passage wall and the outer scavenge passage wall define curved surfaces.

In a further embodiment of any of the foregoing gas turbine engines, the inner scavenge passage wall and the outer scavenge passage wall generally follow a curved outer wall that generally follows a diameter of the adjacent intermediate gear.

In a further embodiment of any of the foregoing gas turbine engines, the inner scavenge passage wall is of a different length than the outer scavenge passage wall.

In a further embodiment of any of the foregoing gas turbine engines, the oil baffle defines a multiple of oil jets.

In a further embodiment of any of the foregoing gas turbine engines, the multiple of oil jets are directed toward a gear mesh between one of the multiple of intermediate gears and a sun gear.

In a further embodiment of any of the foregoing gas turbine engines, the geared architecture includes a planetary gear system.

In a further embodiment of any of the foregoing gas turbine engines, includes a turbine section including a fan drive turbine coupled to drive a fan through the geared architecture and at least one other turbine forward of the fan drive turbine.

In a further embodiment of any of the foregoing gas turbine engines, the geared architecture includes an efficiency greater than about 98%.

In a further embodiment of any of the foregoing gas turbine engines, the gas turbine engine is a high bypass engine having a bypass ratio greater than about ten (ten).

In a further embodiment of any of the foregoing gas turbine engines, the fan includes a fan pressure ratio of less than about 1.45.

A geared architecture for a gas turbine engine according to an exemplary embodiment of this disclosure, among other possible things includes a sun gear defined along an axis. A ring gear is rotationally fixed around the axis. A multiple of planet gears are in meshed engagement with the sun gear and the ring gear. A carrier for rotating about the axis and for rotationally supporting the multiple of planet gears. A multiple of baffles are mounted to the carrier. Each of the baffles includes a multiple of oil nozzles directed toward a gear mesh between one of the multiple of planet gears and the sun gear and an oil scavenge scoop upstream of the multiple of oil nozzles with respect to the gear mesh.

In a further embodiment of any of the foregoing geared architectures, the oil scavenge scoop includes a scavenge passage with an inner scavenge passage wall, an outer scavenge passage wall and a radial outer scavenge passage wall therebetween.

In a further embodiment of any of the foregoing geared architectures, the radial outer scavenge passage wall defines a ramp surface toward the exit.

In a further embodiment of any of the foregoing geared architectures, the radial outer scavenge passage wall defines a peak.

In a further embodiment of any of the foregoing geared architectures, further includes a flow splitter between the inner scavenge passage wall and the outer scavenge passage wall.

In a further embodiment of any of the foregoing geared architectures, the inner scavenge passage wall is of a different length than the outer scavenge passage wall.

In a further embodiment of any of the foregoing geared architectures, the geared architecture provides a speed reduction between a turbine section and a fan section of greater than about 2.3.

A method of designing a geared architecture for a turbine engine according to an exemplary embodiment of this disclosure, among other possible things includes defining a sun gear for rotation about an engine central axis, defining a ring gear to be rotationally fixed around the engine central axis, defining a multiple of planet gears in meshed engagement with the sun gear and the ring gear, configuring a carrier to rotate about the central axis and to rotationally support the multiple of planet gears, and defining the carrier to include at least one baffle with multiple oil nozzles directed toward a gear mesh engagement between one of the multiple of planet gears and the sun gear, and an oil scavenge scoop upstream of the multiple of oil nozzles relative to the gear mesh.

In a further embodiment of any of the foregoing methods, includes configuring the oil scavenge scoop includes defining a scavenge passage with an inner scavenge passage wall, an outer scavenge passage wall and a radial outer scavenge passage wall therebetween.

In a further embodiment of any of the foregoing methods, includes configuring the radial outer scavenge passage wall to define a ramp surface toward the exit.

In a further embodiment of any of the foregoing methods, includes configuring the radial outer scavenge passage wall to define a peak.

In a further embodiment of any of the foregoing methods, includes configuring the geared architecture to provide a speed reduction between a turbine section and a fan section of greater than about 2.3.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
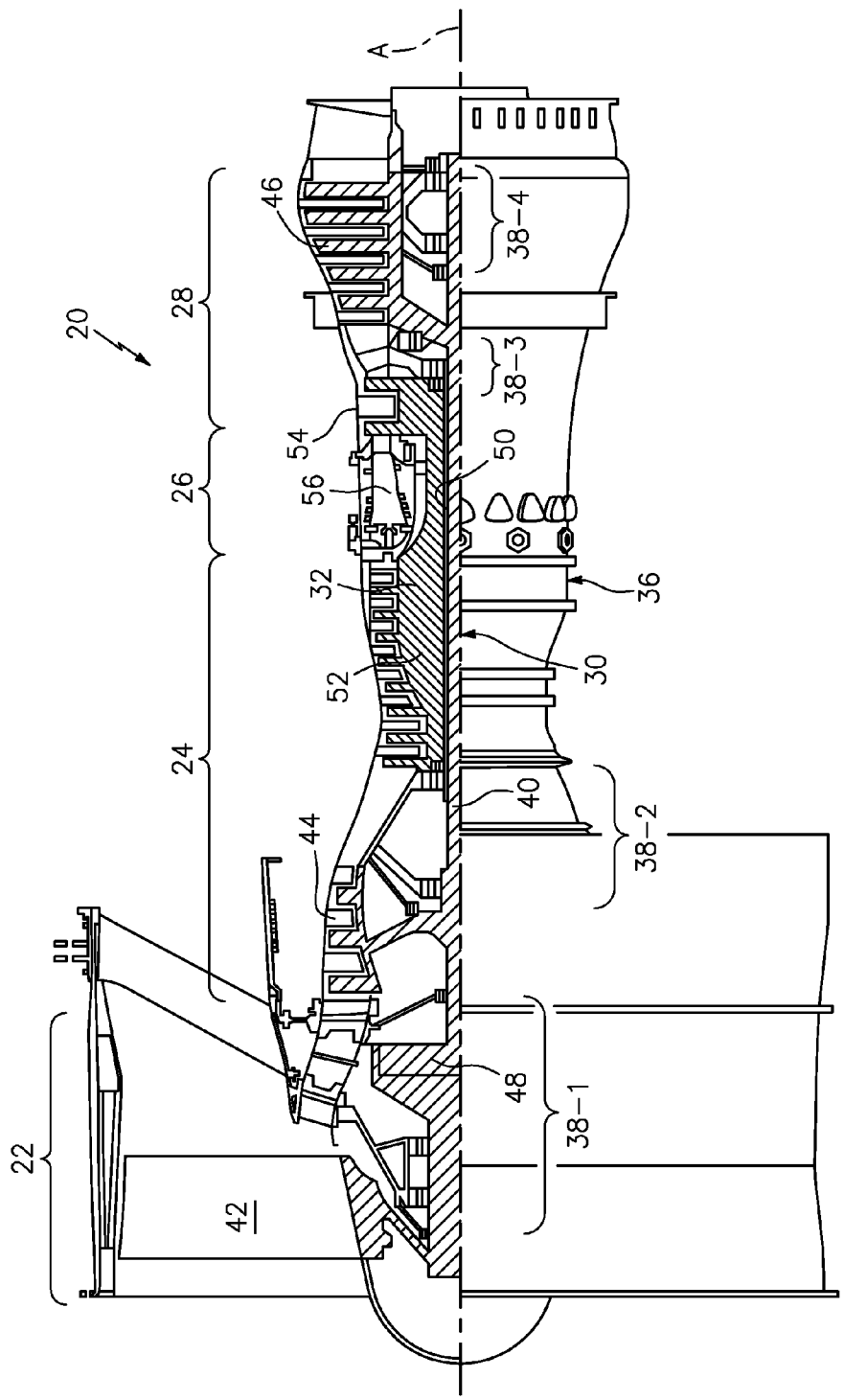
FIG. 1 is a schematic cross-sectional view of a geared architecture gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines architectures such as a low-bypass turbofan may include an augmentor section (not shown) among other systems or features. Although schematically illustrated as a high bypass turbofan in the disclosed non-limiting embodiment, it should be understood that the concepts described herein are not limited to use with turbofans as the teachings may be applied to other types of turbine engines to include but not limited to a three-spool (plus fan) engine wherein an intermediate spool includes an intermediate pressure compressor (IPC) between a low pressure compressor and a high pressure compressor with an intermediate pressure turbine (IPT) between a high pressure turbine and a low pressure turbine as well as other engine architectures such as turbojets, turboshafts, open rotors and industrial gas turbines.

The fan section 22 drives air along a bypass flowpath and into the compressor section 24. The compressor section 24 drives air along a core flowpath for compression and communication into the combustor section 26, which then expands and directs the air through the turbine section 28. The engine 20 generally includes a low spool 30 and a high spool 32 mounted for rotation about an engine central longitudinal axis A relative to an engine case assembly 36 via several bearing compartments 38.

The low spool 30 generally includes an inner shaft 40 that interconnects a fan 42, a low-pressure (or first) compressor 44 and a low-pressure (or first) turbine 46. The inner shaft 40 drives the fan 42 through a geared architecture 48 to drive the fan 42 at a lower speed than the low spool 30. The high spool 32 includes an outer shaft 50 that interconnects a high-pressure (or second) compressor 52 and high-pressure (or second) turbine 54. A combustor 56 is arranged between the high-pressure compressor 52 and the high-pressure turbine 54. As used herein, a "low" pressure compressor or turbine experiences a lower pressure than the corresponding "high" pressure compressor or turbine. The inner shaft 40 and the outer shaft 50 are concentric and rotate about the engine central longitudinal axis A that is collinear with their longitudinal axes.

Core airflow is compressed by the low-pressure compressor 44 then the HPC 52, mixed with the fuel and burned in the combustor 56, then expanded over the HPT 54 and the low-pressure turbine 46. The high-pressure turbine 54 and the low-pressure turbine 46 drive the respective high spool 32 and low spool 30 in response to the expansion.

Figure 2:
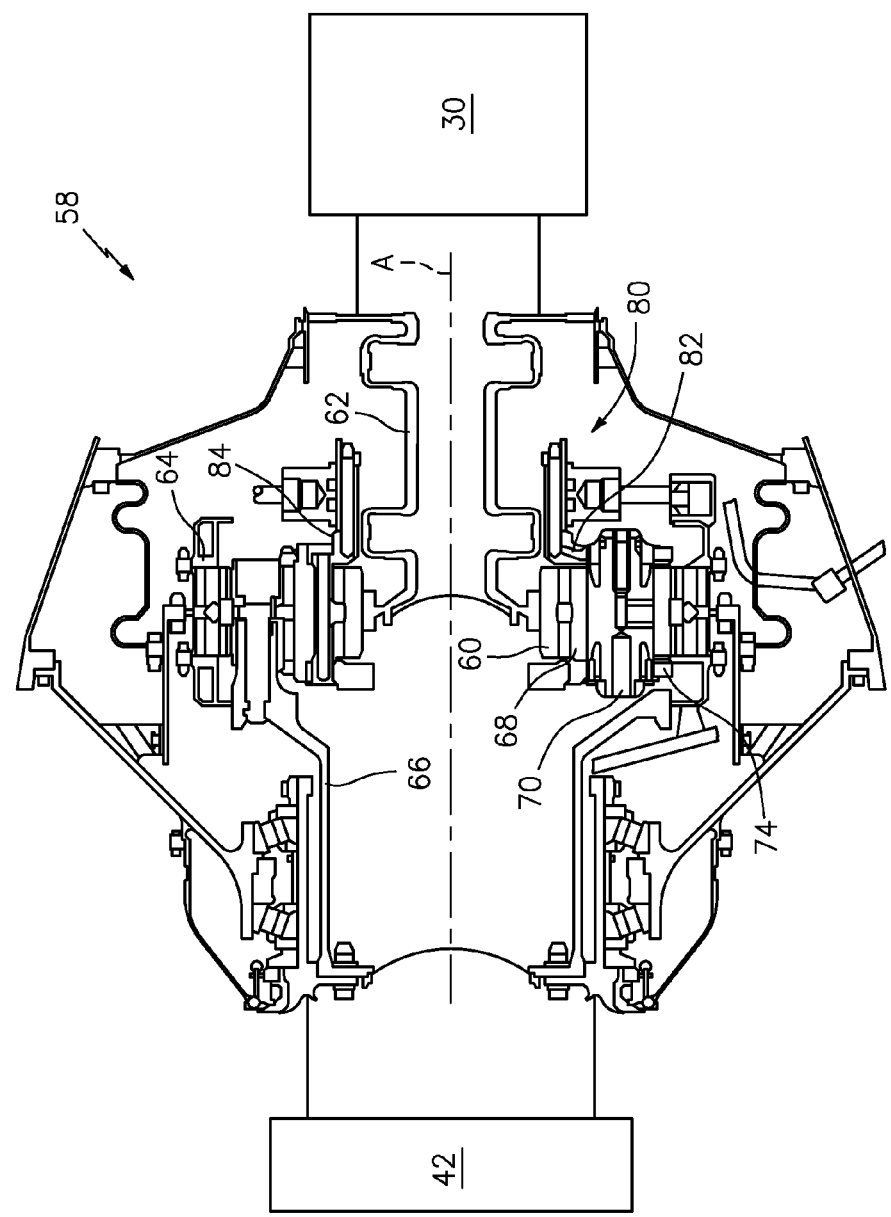
FIG. 2 is an expanded schematic view of the geared architecture.

In one example, the gas turbine engine 20 is a high-bypass geared architecture engine in which the bypass ratio is greater than about six (6:1). The geared architecture 48 can include an epicyclic gear system 58, such as a planetary gear system (FIG. 2). The example epicyclic gear train has a gear reduction ratio of greater than about 2.3, and in another example is greater than about 2.5 with a gear system efficiency greater than approximately 98%. The geared turbofan enables operation of the low spool 30 at higher speeds which can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In one non-limiting embodiment, a significant amount of thrust is provided by the bypass flow due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("T"/518.7)$^{0.5}$. The Low Corrected Fan Tip Speed according to one non-limiting embodiment of the example gas turbine engine 20 is less than about 1150 fps (351 m/s).

With reference to FIG. 2, the epicyclic gear system 58 generally includes a sun gear 60 driven by a flexible input shaft 62 driven by the low spool 30, a rotationally fixed ring gear 64, and a set of planet gears 68 in meshing engagement with the sun gear 60 and ring gear 64. The flexible input shaft 62 transfers torque as well as facilitates the segregation of vibrations and other transients. Each planet gear 68 is rotationally mounted about a carrier post 70 that is respectively supported by a rotating carrier 74. The carrier 74 is connected to a torque frame 66 that connects the geared architecture 58 with the fan 42. It should be appreciated that the epicyclic gear system 58 is but schematically illustrated and is relatively simplified in comparison to the actual system. The rotating carrier 74 of a planetary epicyclic gear system 58 facilitates control and direction of scavenges flows.

Figure 3:
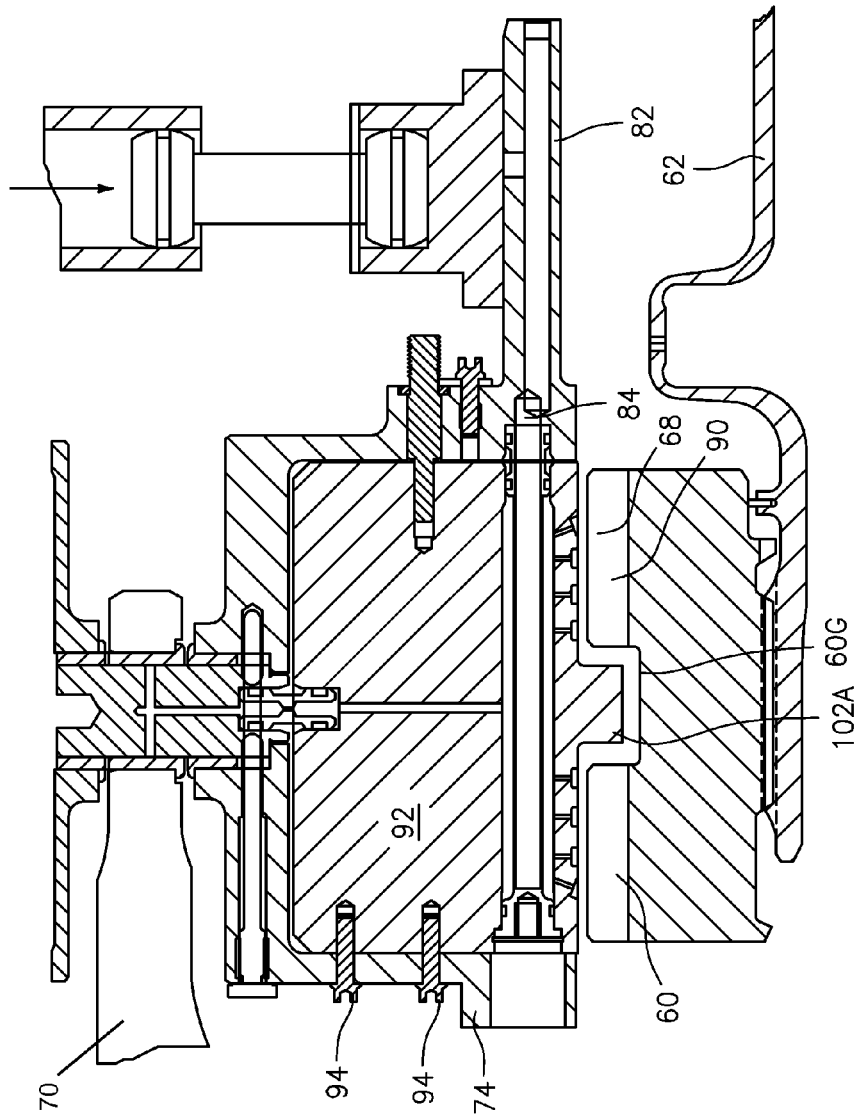
FIG. 3 is a schematic sectional view through a baffle in the geared architecture according to one disclosed non-limiting embodiment.
Figure 4:
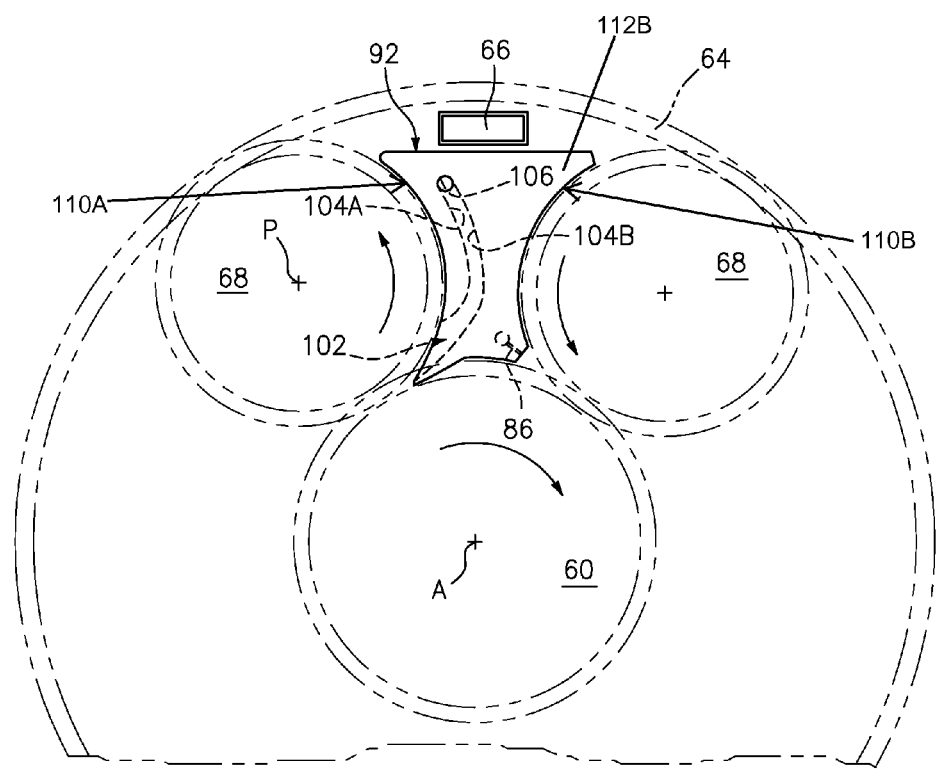
FIG. 4 is a schematic axial view of the baffle of FIG. 3.

The carrier 74 includes an oil manifold 80 that communicates oil through, for example, a first oil circuit 82 into each carrier post 70 (FIG. 3) and a second oil circuit 84 with a multiple of oil jets 86 (FIG. 4). That is, the first oil circuit 82 communicates oil into each carrier post 70 and associated planet gear rotational support structure such as bearings, spherical joints, etc. (not specifically shown). The second oil circuit 84 communicates oil as, for example, a spray directly from the multiple of oil jets 86 onto a respective gear mesh 90 between the sun gear 60 and each planet gear 68. It should be appreciated that the oil manifold 80 is but a component of a lubrication system that is schematically represented and is simplified in comparison to an actual lubrication system that may include numerous other components such as a sump, scavenge pump, main pump and various lubricant reconditioning components such as chip detectors, heat exchangers and deaerators, which need not be described in detail herein.

With reference to FIG. 3, the carrier 74 may include spaced apart side walls that are interconnected by a multiple of baffles 92 which are generally wedge-shaped members (FIG. 4). The carrier 74 mounts each of the multiple of baffles 92 between each two planet gears 68. That is, there is typically one baffle 92 for each planet gear 68. The multiple of baffles 92 are mounted to the carrier 74 via fasteners 94 such as bolts.

Figure 5:
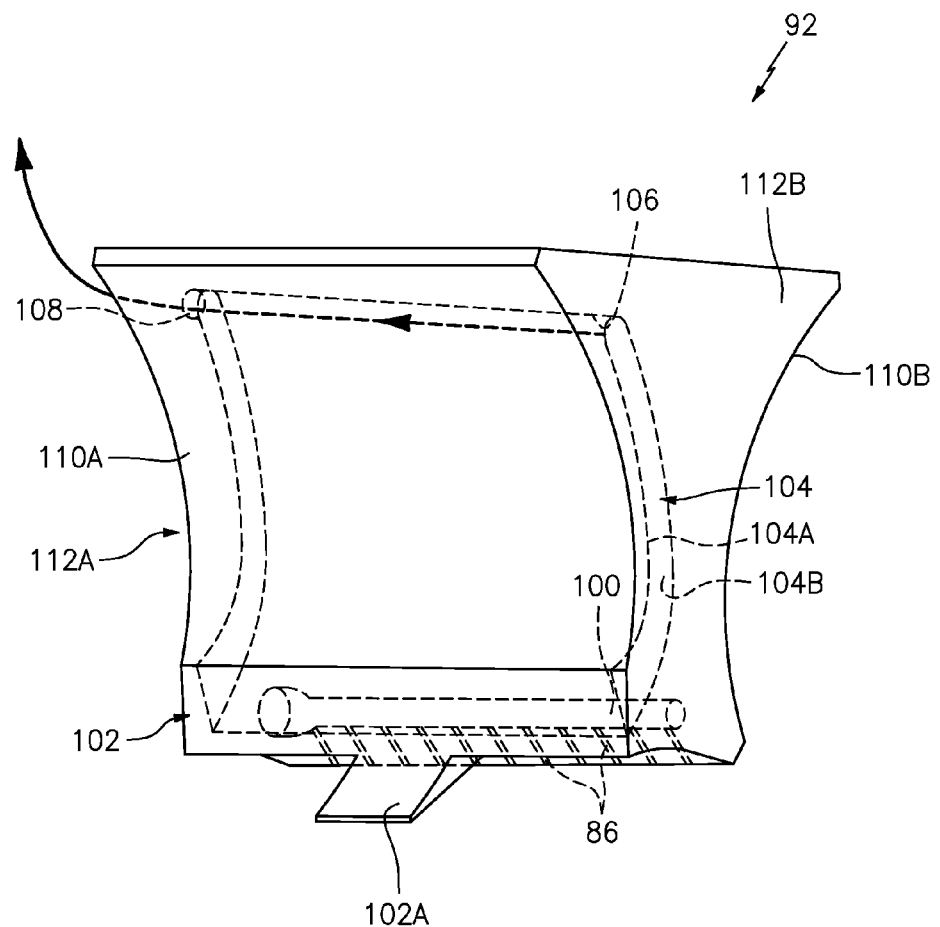
FIG. 5 is a perspective view of the baffle of FIG. 3.

With reference to FIG. 5, according to one disclosed non-limiting embodiment, each baffle 92 includes the multiple of oil jets 86 that extends from an axial oil passage 100 and an oil scavenge scoop 102 (also shown in FIG. 4). Generally, the multiple of oil jets 86 are upstream of the oil scavenge scoop 102 such that oil is injected adjacent to the gear mesh 90, revolves around the planet gear 68 and is then scavenged therefrom by the oil scavenge scoop 102. That is, the baffles 92 facilitate integrated lubricant ingress and egress such that separate components within the carrier 74 are minimized. Furthermore, the baffles 92 can be constructed from a different, lighter weight material than that of the carrier 74.

The oil scavenge scoop 102 includes a scavenge passage 104 with a radial outer scavenge passage wall 106 and an exit 108 adjacent thereto. The baffle 92 is generally wedge shaped with curved outer baffle walls 110A, 110B that generally follow the diameter of the adjacent planet gears 68 (FIG. 4) and end walls 112A, 112B (FIG. 5) transverse thereto. The baffle end walls 112A, 112B are axially displaced one from another with respect to the engine central longitudinal axis A.

The scavenge passage 104 includes an inner scavenge passage wall 104A and an outer scavenge passage wall 104B downstream of the inner scavenge passage wall 104A with respect to an axis P of the adjacent planet gear 68 (FIG. 4). In this disclosed non-limiting embodiment, the inner scavenge passage wall 104A and the outer scavenge passage wall 104B generally follow the curvature of the outer baffle wall 110A. The outer scavenge passage wall 104B is circumferentially located to direct oil from the adjacent planet gear 68 into the scavenge passage 104. That is, the oil scavenge scoop 102 is generally arranged with respect to the rotational direction of the planet gear 68.

The outer scavenge passage wall 104B may include an apex extension that extends at least partially into a groove 60G in the sun gear 60 (FIG. 3) such along the middle of a double helical gear to facilitate ingress of oil from the gear mesh 90 between the sun gear 60 and the planet gear 68. It should be appreciated that other gear arrangements that operate with or without the apex will also benefit herefrom.

Once in the scavenge passage 104, centrifugal forces from the carrier 74 rotation drives the oil radially outward. The baffle scavenge passage 104 directs oil away from the rotating planet gears 68 to, for example, reduce churning losses. The outer scavenge passage wall 106 in this disclosed non-limiting embodiment, is ramp shaped with the ramp extended toward the exit 108 (FIG. 6).

Figure 6:
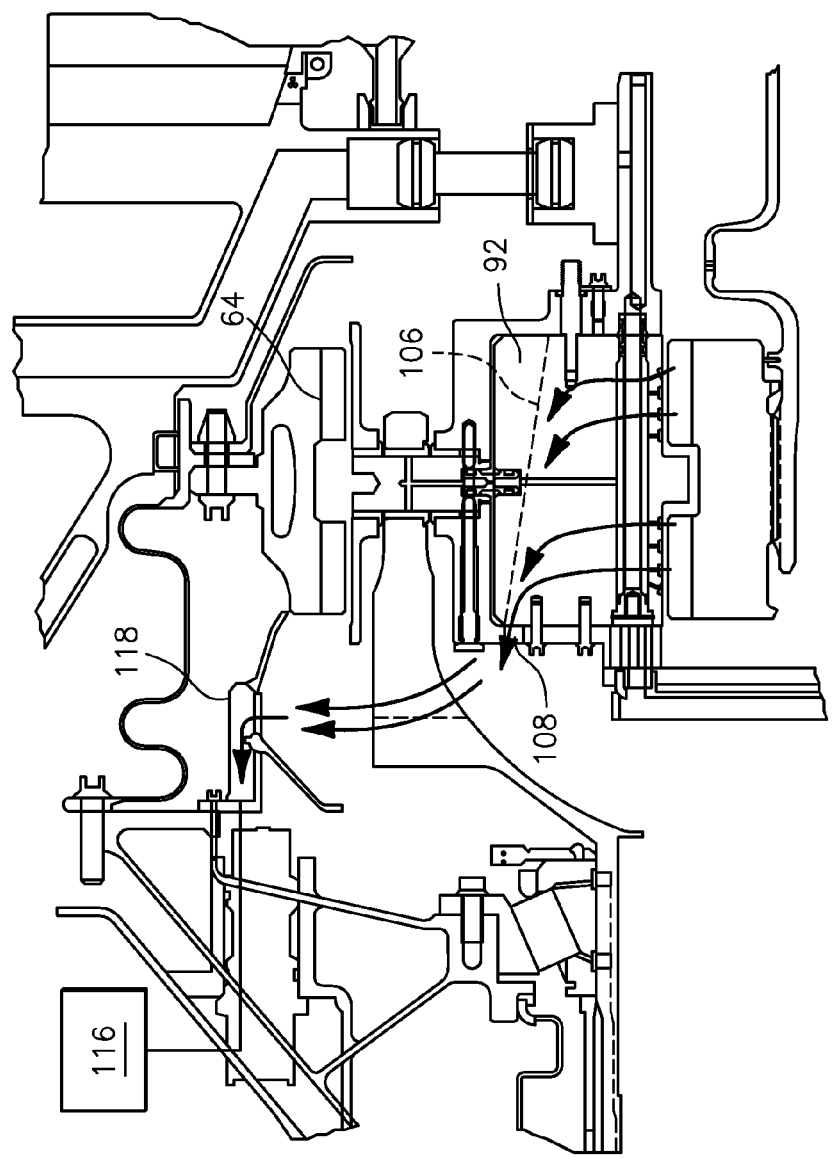
FIG. 6 is a schematic sectional view of a portion of the geared architecture through the baffle of FIG. 3.

With reference to FIG. 6, once communicated through the baffle 92, the oil is, for example, radially expelled into an auxiliary oil system 116 (illustrated schematically) through, for example, a scavenger gutter 118 radially outboard of the ring gear 64. It should be appreciated that various oil systems may alternatively or additionally be provided.

The baffle scavenge passage 104 may be geometrically defined to direct a quantity of oil sufficient to supply, for example, the auxiliary oil system 116 with the remainder directed to a sump system. Many gear train components are able to tolerate lubricant starvation for various intervals of time, however some components may be less tolerant of lubricant starvation such that the auxiliary oil system 116 ensures an oil flow, at least temporarily, under all conditions inclusive of reduced-G conditions which may arise from aircraft maneuvers and/or aircraft orientation. It should be appreciated that various oil systems may alternatively or additionally be provided.

Figure 7:
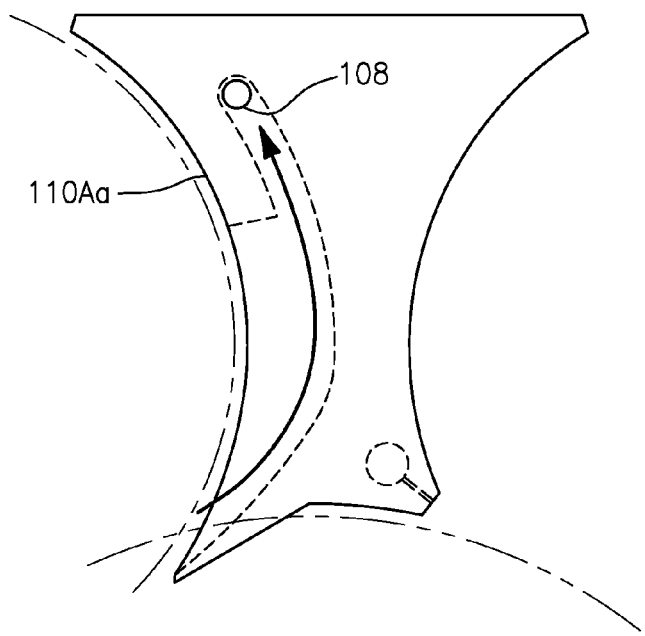
FIG. 7 is a schematic axial view of a baffle according to another disclosed non-limiting embodiment.
Figure 8:
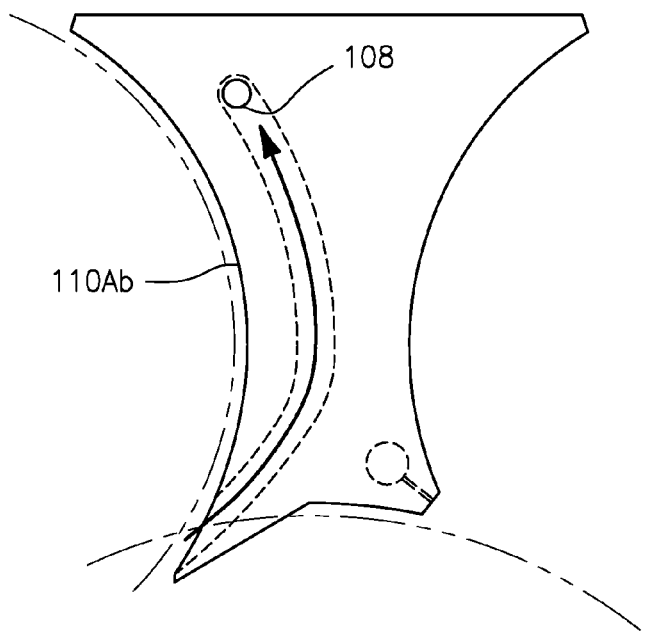
FIG. 8 is a schematic axial view of a baffle according to another disclosed non-limiting embodiment.

Through control of the scavenge flow, i.e., not over flowing, the auxiliary oil system 116, churning losses are reduced. For example, the arcuate wall 110Aa may be of reduced length (FIG. 7) to entrain more air within the scavenge passage 104 to increase the velocity of the oil or the arcuate wall 110Ab may be of extended length (FIG. 8) to entrain less air within the scavenge passage 104 to decrease the velocity of the oil. It should be appreciated that various other shapes and geometric configurations may also be utilized.

Figure 9:
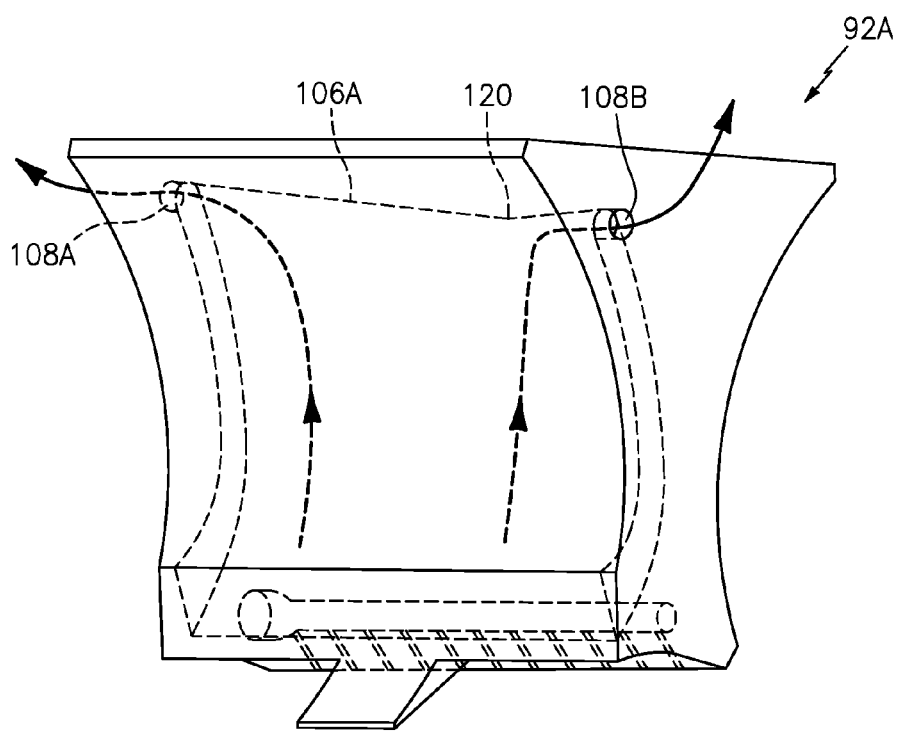
FIG. 9 is a perspective view of a baffle according to another disclosed non-limiting embodiment.
Figure 10:
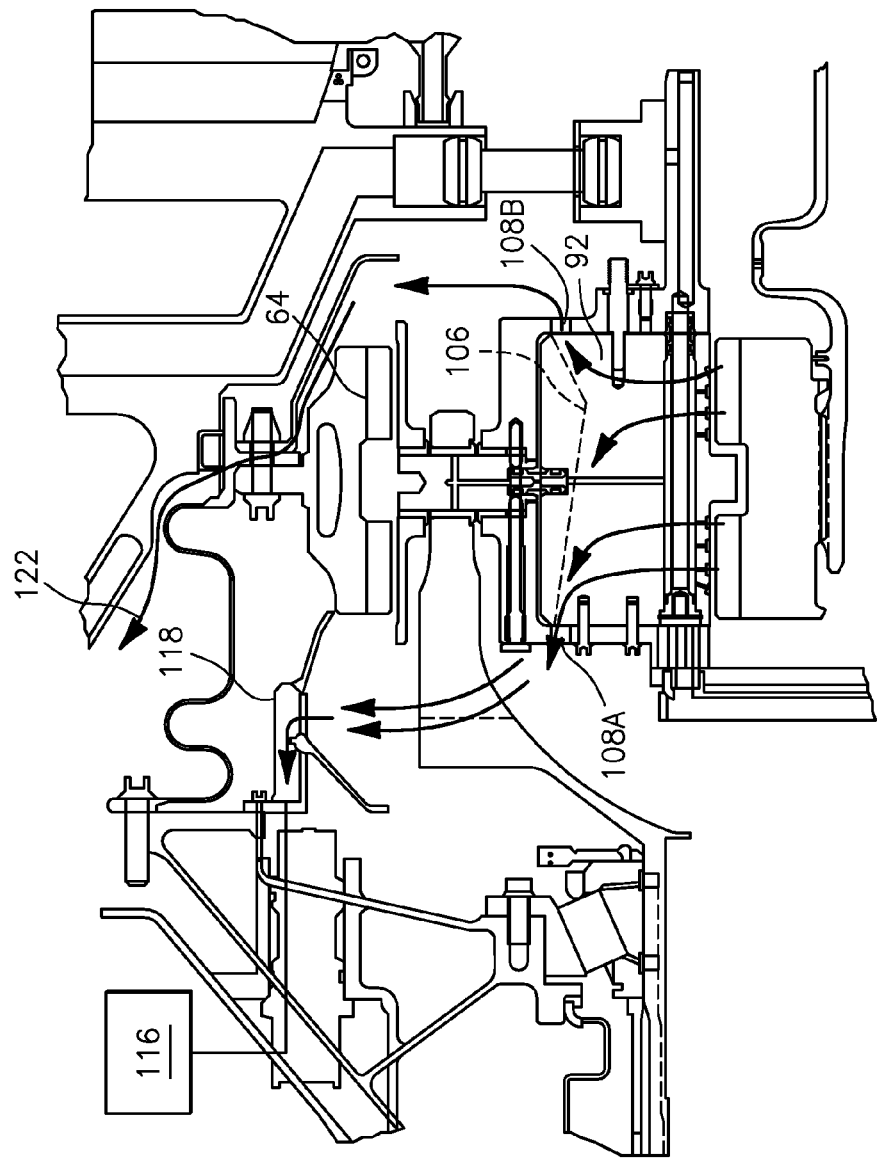
FIG. 10 is a schematic sectional view through the baffle of FIG. 9 in the geared architecture.

With reference to FIG. 9, according to another disclosed non-limiting embodiment, each baffle 92A includes an outer scavenge passage wall 106A with a peak 120. The peak 120 splits the oil flow to a forward exit 108A and an aft exit 108B (FIG. 10). The location of the peak 120 controls the forward and aft distribution of oil. For example, a peak located in the middle of the outer scavenge passage wall 106A provides a 50%-50% distribution between, for example, the auxiliary oil system 116 and oil sump system 122. It should be appreciated that other distributions may alternatively be provided.

Figure 11:
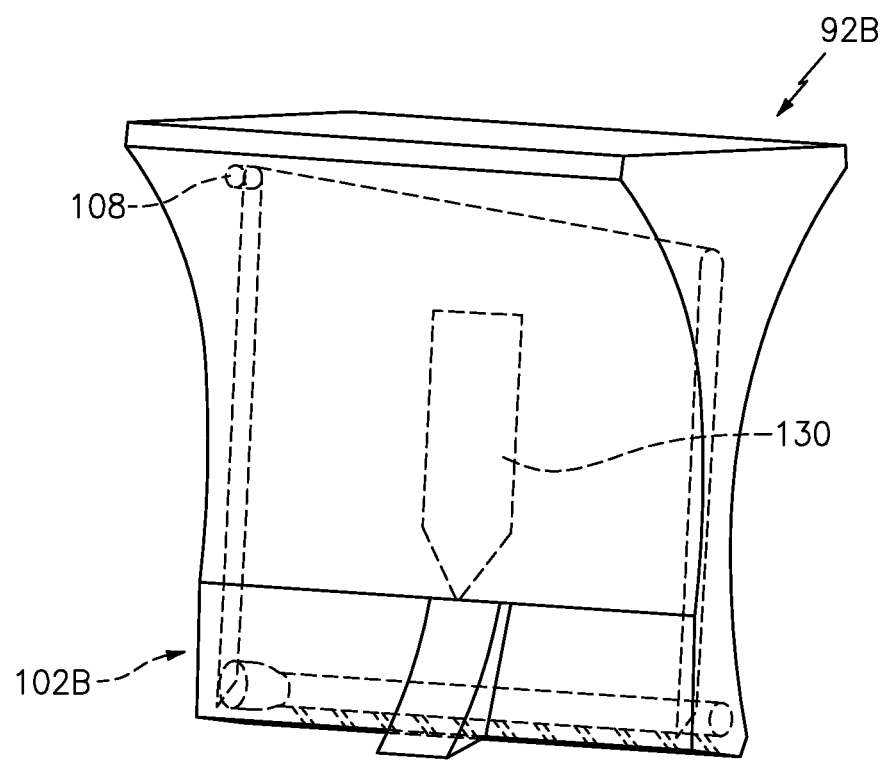
FIG. 11 is a perspective view of a baffle according to another disclosed non-limiting embodiment.

With reference to FIG. 11, according to another disclosed non-limiting embodiment, each baffle 92B includes a flow splitter 130 within the scavenge scoop 102B. The flow splitter 130, in addition to facilitation of the forward and aft distribution of oil, also provides structural support between the walls 104A, 104B.

The baffle 92 scavenge flow paths facilitate system efficiency through reduced windage and churning losses. In addition, controlling the amount of oil flow to the auxiliary oil system 116 minimizes overflow churning losses.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A gas turbine engine, comprising:
    a geared architecture with a multiple of intermediate gears; and
    a baffle with an oil scavenge scoop adjacent to each of the multiple of intermediate gears.

2. The gas turbine engine as recited in claim 1, wherein each of the multiple of intermediate gears and the baffles are mounted to a rotational carrier.

3. The gas turbine engine as recited in claim 1, wherein the oil scavenge scoop includes a scavenge passage with an inner scavenge passage wall, an outer scavenge passage wall and a radial outer scavenge passage wall therebetween.

4. The gas turbine engine as recited in claim 3, wherein the radial outer scavenge passage wall defines a ramp surface.

5. The gas turbine engine as recited in claim 4, further comprising an exit through a baffle end wall adjacent to the radial outer passage.

6. The gas turbine engine as recited in claim 5, wherein the radial outer scavenge passage wall defines a peak.

7. The gas turbine engine as recited in claim 6, further comprising a first exit through a first baffle end wall adjacent to the radial outer passage and a second exit through a second baffle end wall adjacent to the radial outer passage.

8. The gas turbine engine as recited in claim 3, further comprising a flow splitter between the inner scavenge passage wall and the outer scavenge passage wall.

9. The gas turbine engine as recited in claim 8, wherein the inner scavenge passage wall and the outer scavenge passage wall define curved surfaces.

10. The gas turbine engine as recited in claim 9, wherein the inner scavenge passage wall and the outer scavenge passage wall generally follow a curved outer wall that generally follows a diameter of the adjacent intermediate gear.

11. The gas turbine engine as recited in claim 10, wherein the inner scavenge passage wall is of a different length than the outer scavenge passage wall.

12. The gas turbine engine as recited in claim 1, wherein the oil baffle defines a multiple of oil jets.

13. The gas turbine engine as recited in claim 12, wherein the multiple of oil jets are directed toward a gear mesh between one of the multiple of intermediate gears and a sun gear.

14. The gas turbine engine as recited in claim 1, wherein the geared architecture includes a planetary gear system.

15. The gas turbine engine as recited in claim 14, including a turbine section including a fan drive turbine coupled to drive a fan through the geared architecture and at least one other turbine forward of the fan drive turbine.

16. The gas turbine engine as recited in claim 15, wherein the geared architecture includes an efficiency greater than about 98%.

17. The gas turbine engine as recited in claim 15, wherein the fan includes a fan pressure ratio of less than about 1.45.

18. The gas turbine engine as recited in claim 1, wherein the gas turbine engine is a high bypass engine having a bypass ratio greater than about ten (ten).

19. A geared architecture for a gas turbine engine, comprising:
    a sun gear defined along an axis;
    a ring gear rotationally fixed around the axis;
    a multiple of planet gears in meshed engagement with the sun gear and the ring gear;
    a carrier for rotating about the axis and for rotationally supporting the multiple of planet gears; and
    a multiple of baffles mounted to the carrier, each of the baffles includes a multiple of oil nozzles directed toward a gear mesh between one of the multiple of planet gears and the sun gear and an oil scavenge scoop upstream of the multiple of oil nozzles with respect to the gear mesh.

20. The geared architecture as recited in claim 19, wherein the oil scavenge scoop includes a scavenge passage with an inner scavenge passage wall, an outer scavenge passage wall and a radial outer scavenge passage wall therebetween.

21. The geared architecture as recited in claim 20, wherein the radial outer scavenge passage wall defines a ramp surface toward the exit.

22. The geared architecture as recited in claim 20, wherein the radial outer scavenge passage wall defines a peak.

23. The geared architecture as recited in claim 20, further comprising a flow splitter between the inner scavenge passage wall and the outer scavenge passage wall.

24. The geared architecture as recited in claim 20, wherein the inner scavenge passage wall is of a different length than the outer scavenge passage wall.

25. The geared architecture as recited in claim 19, wherein the geared architecture provides a speed reduction between a turbine section and a fan section of greater than about 2.3.

26. A method of designing a geared architecture for a turbine engine, the method comprising:
    defining a sun gear for rotation about an engine central axis;
    defining a ring gear to be rotationally fixed around the engine central axis;
    defining a multiple of planet gears in meshed engagement with the sun gear and the ring gear;
    configuring a carrier to rotate about the central axis and to rotationally support the multiple of planet gears; and
    defining the carrier to include at least one baffle with multiple oil nozzles directed toward a gear mesh engagement between one of the multiple of planet gears and the sun gear, and an oil scavenge scoop upstream of the multiple of oil nozzles relative to the gear mesh.

27. The method of designing a geared architecture as recited in claim 26, wherein configuring the oil scavenge scoop includes defining a scavenge passage with an inner scavenge passage wall, an outer scavenge passage wall and a radial outer scavenge passage wall therebetween.

28. The method of designing a geared architecture as recited in claim 27, including configuring the radial outer scavenge passage wall to define a ramp surface toward the exit.

29. The method of designing a geared architecture as recited in claim 27, including configuring the radial outer scavenge passage wall to define a peak.

30. The method of designing a geared architecture as recited in claim 26, including configuring the geared architecture to provide a speed reduction between a turbine section and a fan section of greater than about 2.3.

* * * * *